United States Patent
Lavoignat (12)

(10) Patent No.: US 11,727,204 B2
(45) Date of Patent: Aug. 15, 2023

(54) SCHEMA AND OBJECT EXTRACTOR

(71) Applicant: SAP SE, Walldorf (DE)

(72) Inventor: Sebastien Lavoignat, Droue-sur-Drouette (FR)

(73) Assignee: SAP SE, Walldorf (DE)

( * ) Notice: Subject to any disclaimer, the term of this patent is extended or adjusted under 35 U.S.C. 154(b) by 193 days.

(21) Appl. No.: 17/028,160

(22) Filed: Sep. 22, 2020

(65) Prior Publication Data

US 2022/0092257 A1    Mar. 24, 2022

(51) Int. Cl.
*G06F 40/137* (2020.01)
*G06F 40/18* (2020.01)

(52) U.S. Cl.
CPC .................................... *G06F 40/18* (2020.01)

(58) Field of Classification Search
CPC ............................... G06F 40/18; G06F 40/137
See application file for complete search history.

(56) References Cited

U.S. PATENT DOCUMENTS

| | | | |
|---|---|---|---|
| 2005/0060647 A1* | 3/2005 | Doan | G06F 16/248 715/205 |
| 2009/0138491 A1* | 5/2009 | Chowdhury | G06F 16/84 |
| 2013/0117648 A1* | 5/2013 | Boutin | G06F 40/18 715/212 |
| 2015/0134670 A1* | 5/2015 | Liu | G06F 16/2246 707/741 |

* cited by examiner

*Primary Examiner* — Jennifer N Welch
*Assistant Examiner* — Amy P Hoang
(74) *Attorney, Agent, or Firm* — Buckley, Maschoff & Talwalkar LLC (57) ABSTRACT

Systems and methods include reading of a spreadsheet workbook including a plurality of rows and a header row comprising a plurality of column labels, automatic determination of a hierarchical schema based on the plurality of column labels, the hierarchal schema comprising a hierarchy of nodes, where each of the plurality of column labels is associated with a single node of the hierarchy of nodes, and, for each row of the plurality of rows, determination of a value associated with each of the plurality of column labels, and, for each determined value, population of a node of an instance of the hierarchical schema associated with an associated column label.

9 Claims, 10 Drawing Sheets

SCHEMA AND OBJECT EXTRACTOR

BACKGROUND

Software applications, executed on-premise or in the cloud, have profoundly increased the efficiency of many tasks. Software-based automated systems provide further benefits by allowing users to easily design software-driven flows and execute the flows with little or no human intervention. These flows may be used, for example, to perform automatic processing of stored data.

User data is often stored in spreadsheet form. Accordingly, a flows for processing such data might be designed to open a particular spreadsheet workbook, read the rows of the workbook, and execute a set of functions with respect to the data of each row. For example, a flow may complete fields of a letter template with the data of each row such that a custom letter is generated for each row.

Reading the workbook rows results in a flat list of column values for each row, in which each value in a row is associated with a column number (e.g., 1, 2) of the column in which the value is located. Accordingly, any further processing of the rows requires developing code or configuring a workflow element with reference to the column numbers. Such development requires advance knowledge of the particular data which is found in each numbered column, and is difficult to work with or maintain due to the non-intuitive nature of column numbers.

If the column header text is known in advance, the code or flows element may provide a mapping from column numbers to variables which are named according to corresponding header text. While this mapping may facilitate development of the code or workflow element, the mapping and any function relying thereon breaks down if one or more columns are changed to hold data values other than those specified by the mapping. Such changes may include moving a column, deleting a column, inserting a new column, etc.

Systems are desired to extract data from a workbook in a semantically meaningful manner. Such systems may facilitate the development of subsequent processes for utilizing the data. The extraction may be performed such that the subsequent processes are robust to changes in the arrangement of workbook columns and usable with respect to more than one workbook column arrangement.

DETAILED DESCRIPTION

The following description is provided to enable any person in the art to make and use the described embodiments. Various modifications, however, will remain readily-apparent to those in the art.

Some embodiments provide automatic extraction of a schema from a spreadsheet workbook. For each row of the workbook, embodiments further provide automatic extraction an object conforming to the schema. The schema may be hierarchical and is extracted based on the header row of each column of the workbook.

Code or other programming elements designed to utilize thusly-extracted objects may be more understandable and maintainable than code or elements which reference row properties based on their respective column indices. Moreover, elements which utilize the objects may be immune to changes in the arrangement of the columns, to the insertion of columns, and to the deletion of unused columns. The elements may also be usable with respect to different input workbooks having different column arrangements, so long as the different input workbooks share the named columns utilized by the code or other programming elements.

Figure 1:
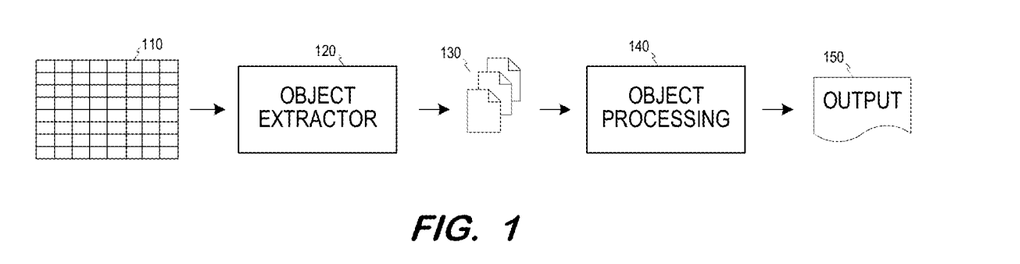
FIG. 1 is a block diagram of a software workflow according to some embodiments.

FIG. 1 illustrates a software workflow according to some embodiments. The illustrated software workflow may be designed and executed using any combination of hardware and/or software components that is or becomes known. Such a combination may comprise local and/or cloud-based components.

As shown, workbook 110 is initially received by object extractor 120. Workbook 110 includes a plurality of records which may conceptualized as table rows. Each record, or row, includes one or more property values which may be conceptualized as table column values. Workbook 110 also includes a text label for each property, or column. The text labels may comprise a header row of workbook 110. Workbook 110 may be instantiated using any suitable electronic spreadsheet format, including but not limited to .csv, .xls and .ods.

Object extractor 120 operates as described herein to extract a schema from workbook 110 and, for each row of worksheet 110, extract an object conforming to the schema. The extraction is based on the column labels of workbook 110. Object extractor 120 may output extracted objects 130, each of which corresponds to a row of workbook 110. As described above, the extracted schema to which objects 130 conform may include hierarchical levels.

Each of objects 130 may conform to an object notation (e.g., JavaScript Object Notation) which provides semantic meaning to the column values stored therein. For example, each node of objects 130 may be associated with a descriptive name which describes the value stored within the node.

Objects 130 may be utilized in further processing executed by object processing component 140. The further processing may comprise any processing that is or becomes known. If the schema to which objects 130 conform includes a node hierarchy, object processing component 130 may retrieve vales of all child nodes of a given parent node by referencing the parent node. The further processing implemented by object processing component 140 may be designed via traditional code development or a higher-level "low code" development platform as described below.

Object processing component 140 generates output 150 based on objects 130. Output 150 may comprise one or more files, data, commands and/or any other suitable output. Output 150 may pass to one or more other processing components of other unshown workflows.

Figure 2:
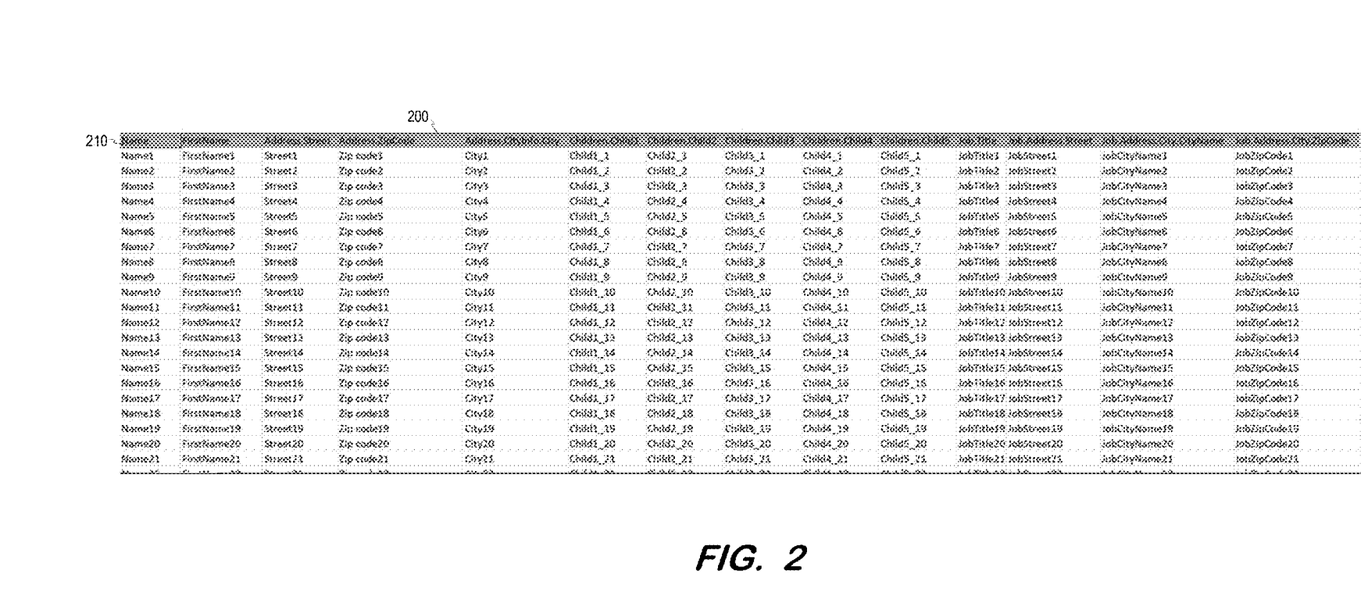
FIG. 2 is an example of a spreadsheet workbook according to some embodiments.

FIG. 2 is a tabular representation of workbook 200. Workbook 200 is provided as an example and embodiments are not limited to any particular characteristic thereof.

Workbook 200 includes header row 210 which provides a text label corresponding to each column of workbook 200. The text label corresponding to a column may provide a description of the values stored in each row of the column. Some of the text labels include the delimiter ".". As will be described below, the text labels and optional delimiters may be used to extract a hierarchical schema from workbook 200. Embodiments are not limited to the delimiter "." or to any single delimiter.

Figure 3:
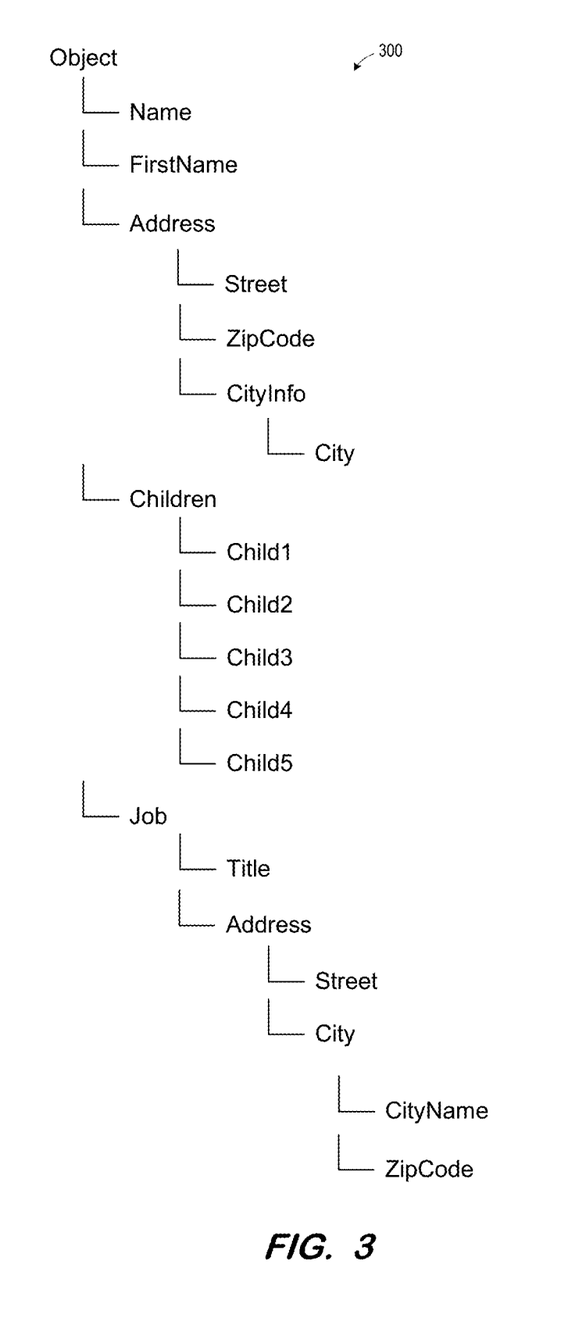
FIG. 3 is a diagram of a schema generated based on a spreadsheet workbook according to some embodiments.

FIG. 3 is a representation of schema 300 extracted from workbook 200 according to some embodiments. Each text label of workbook 200 which does not include a delimiter (i.e., Name, FirstName) is represented by a node at the highest hierarchical level of schema 300. For each column text label which includes one or more delimiters, the leftmost text is represented by a node at the highest hierarchical level, and each delimiter is interpreted as defining a parent node/child node relationship between text preceding the delimiter and text following the delimiter. Accordingly, in the case of the column text label Job.Address.Street, a Job node is determined at the highest hierarchical level of schema 300, a first parent node/child node relationship is determined between Job and Address, and a second parent node/child node relationship is determined between Address and Street.

Based on the above, the order of the columns of workbook 200 does not affect the logical relations embodied within schema 300. Moreover, if a column is added to or deleted from workbook 200 and a new schema extracted therefrom, the new schema would be unchanged with respect to the remaining original nodes of schema 300. Accordingly, further processing which is dependent on particular nodes of schema 300 will not be affected as long column labels corresponding to the particular nodes remain in the modified workbook 200.

Figure 4A:
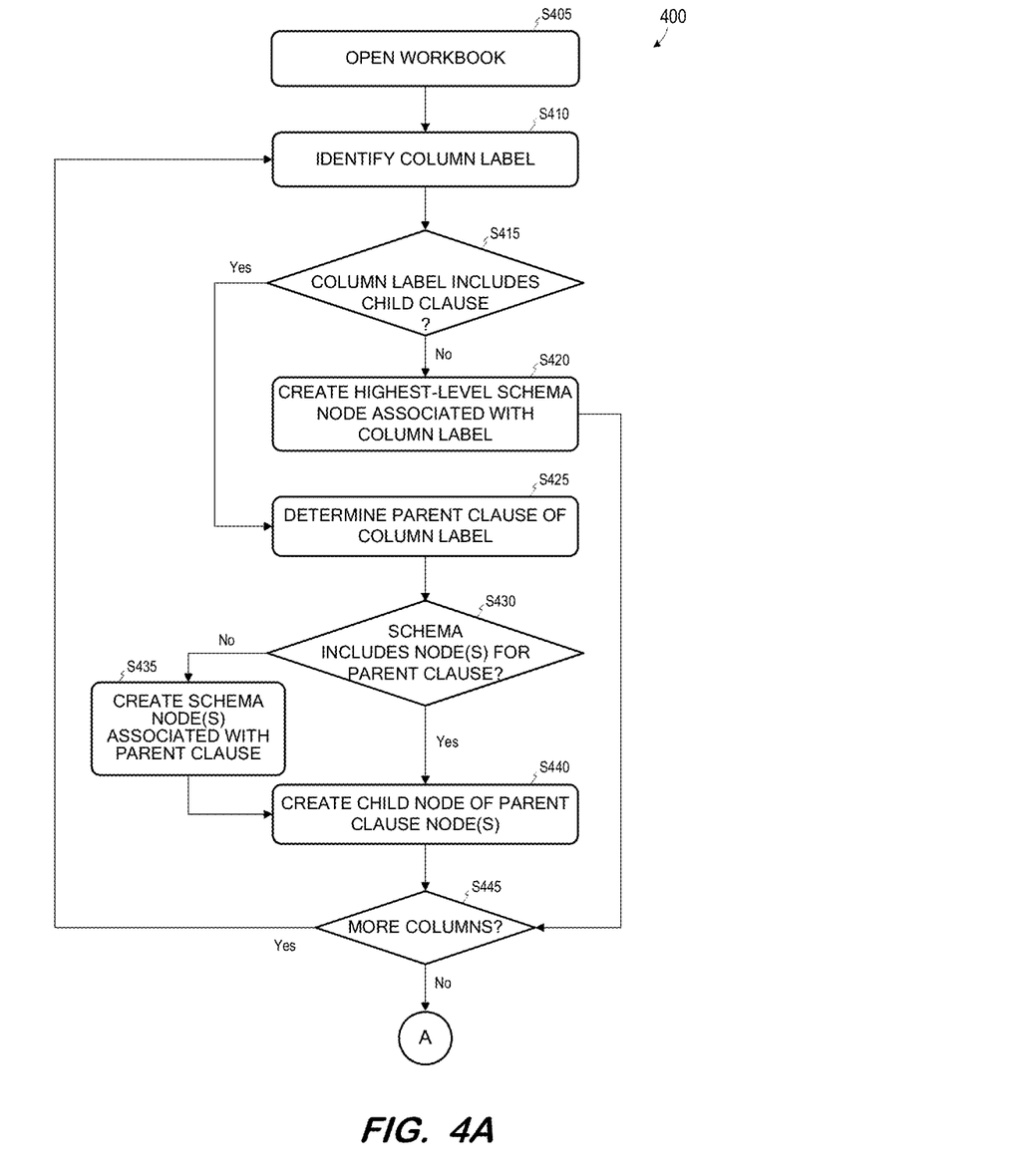
FIGS. 4A and 4B comprise a flow diagram of a process to extract a schema and corresponding objects from a spreadsheet workbook according to some embodiments.
Figure 4B:
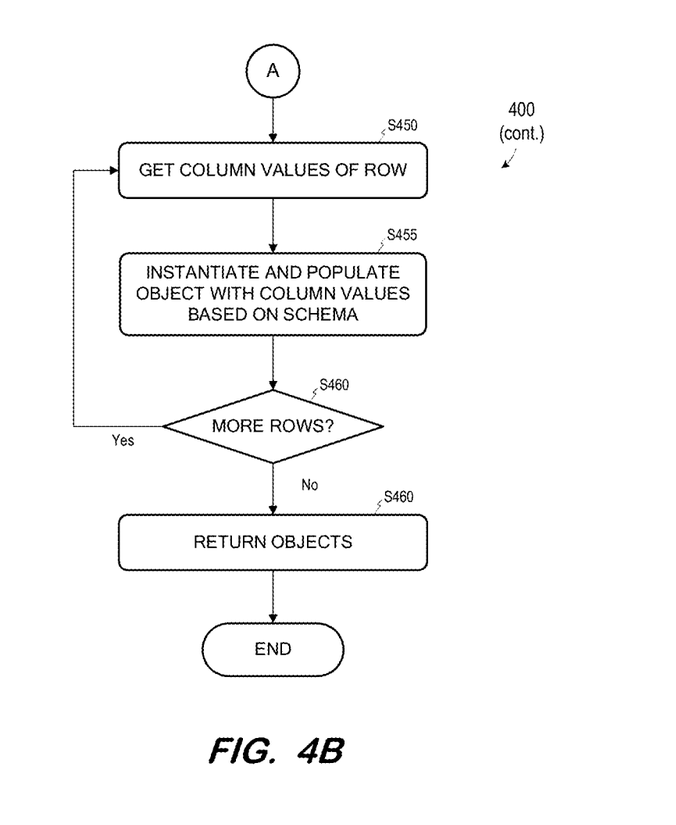

FIG. 4 is a flow diagram of process 400 to extract a schema and objects from a workbook according to some embodiments. Process 400 may be performed using any suitable combination of hardware and software. Software program code embodying these processes may be stored by any non-transitory tangible medium, including a fixed disk, a volatile or non-volatile random access memory, a DVD, a Flash drive, or a magnetic tape, and executed by any number of processing units, including but not limited to processors, processor cores, and processor threads. Such processors, processor cores, and processor threads may be implemented by a virtual machine provisioned in a cloud-based architecture. Embodiments are not limited to the examples described below.

Process 400 may be an element of a larger process, or automation. Execution of process 400 may be initiated by a preceding step of such a process. A workbook is opened at S405. The workbook may comprise a file residing on a local computer, and may be opened by instantiating a software application which is installed on the local computer and compatible with the file format of the workbook, and operating the software application to open the file.

A column label of the open workbook is identified at S410. The identified column label may be the value of a first cell of a header row of the workbook, but may be a value of any cell which represents a label of a column of the workbook. For purposes of the present example, it will be assumed that workbook 200 is opened at S405 and the column label Name is identified at the first iteration of S410.

At S415, it is determined whether the column label includes a child clause. In some embodiments, the determination at S415 includes a determination of whether the identified column label includes a delimiter. Since the label Name does not include a delimiter, flow proceeds to S420.

Figure 5A:
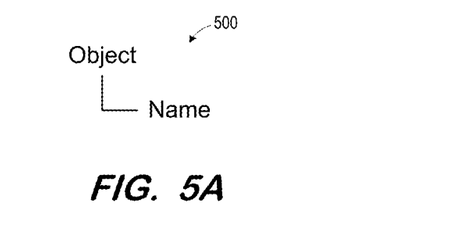
FIGS. 5A through 5F illustrate generation of a schema according to some embodiments.

A node associated with the identified column label is created (i.e., defined) at the highest hierarchical level of the schema at S420. FIG. 5A illustrates schema 500 during extraction from workbook 200 according to some embodiments. As shown, a node has been created at S420 corresponding to the column label Name. The created node is associated with the first column of workbook 200, which facilitates extraction of objects based on the rows of workbook 200 as will be described below. Schema 500 is depicted in FIGS. 5A-5F in a manner illustrating hierarchical relationships between nodes thereof. Such relationships may be instantiated within stored data in any suitable manner and using any software programming system that are or become known.

Continuing the example, flow proceeds to S445 to determine whether additional columns remain to be processed. The present example considers each column of workbook 200 in left-to-right sequential order, but embodiments of process 400 may consider the columns of the subject workbook in any suitable order. If more columns remain to be processed, flow returns to S410 from S445 to identify a label of a next column.

Figure 5B:
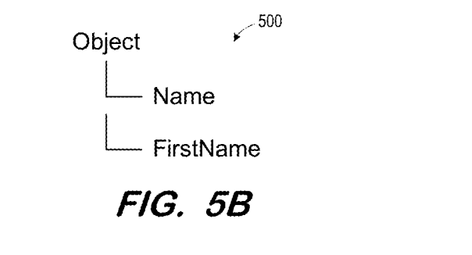

Flow proceeds as described above through S410, S415, and S420 in the case of the FirstName column. The resulting schema 500 is shown in FIG. 5B, in which the FirstName node is associated with the second column of workbook 200. Flow then returns to S410 to identify the column label Address.Street. Since the column label includes a child clause (i.e., due to the presence of delimiter "."), flow proceeds to S425 to determine the parent clause of the column label. For purposes of the present description, the parent clause consists of all text to the left of the right-most delimiter and the text to the right of the right-most delimiter is considered the child clause. In the case of the column label Address.Street, the parent clause is Address.

Figure 5C:
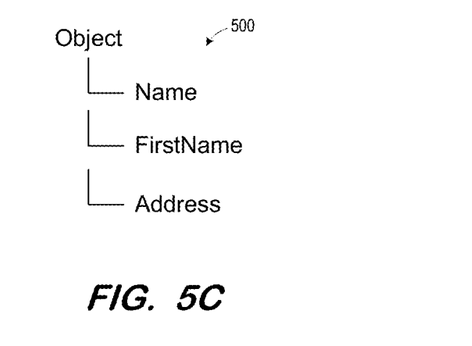

At S430, it is determined whether the current schema includes nodes representing the determined parent clause. Turning to FIG. 5B, it is determined that schema 500 does not include an Address node. Accordingly, schema nodes associated with the parent clause are created at S435. FIG. 5C shows schema 500 including highest-level node Address created at S435 in the present example.

Figure 5D:
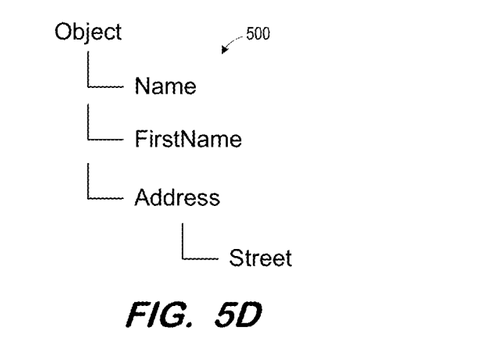

Next, at S440, a child node is created for the child clause of the current column label. The child node (i.e., Street) is created at a hierarchical level of the schema beneath the already-created parent node, as shown in FIG. 5D. This child node is associated with the third column of workbook 200. Flow then again proceeds through S445 to S410 if more columns remain to be processed.

Figure 5E:
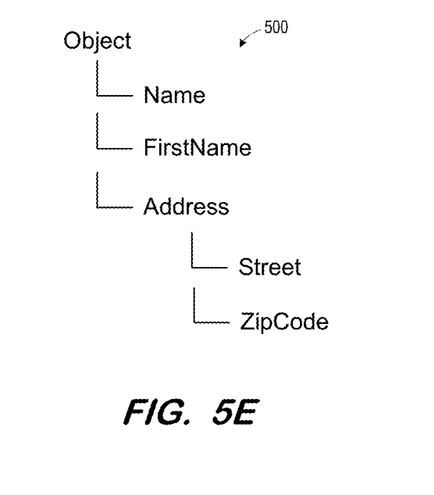

The next column in workbook 200 includes the column label Address.ZipCode. Based on the above explanation, it is determined at S415 that the column label includes a child clause, and the parent clause is determined as Address at S425. At S430, it is determined that schema 500 already includes a node associated with the parent clause Address. Accordingly, at S440, a child node ZipCode is created at a hierarchical level beneath the parent node Address, as shown in FIG. 5E.

The next column in workbook 200 includes the column label Address.Street.CityInfo.City. The child clause of this column label (i.e., the text to the right of the right-most delimiter) is determined as City at S415. Consequently, the parent clause is determined as Address.Street.CityInfo at S425. At S430, it is determined whether schema 500 includes nodes associated with the parent clause Address.Street.CityInfo.

It is noted that parent clause Address.Street.CityInfo includes delimiters. Each delimiter represents a separation between different (i.e., parent and child) hierarchical levels of the schema being extracted. Parent clause Address.Street.CityInfo therefore represents a multi-node structure, in which Address is the parent of Street which is in turn the parent of CityInfo. S430 therefore includes a determination of whether the current schema includes such a structure.

Figure 5F:
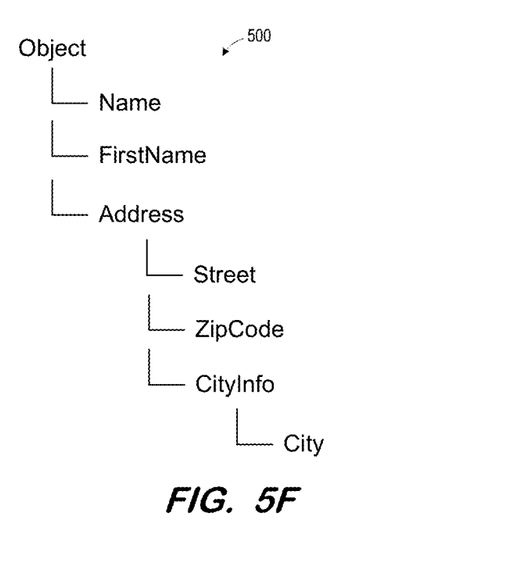

In the present example schema 500 does not include such a structure. Therefore, schema nodes associated with the parent clause are created at S435. According to some embodiments, only those nodes which are needed to create the structure are created at S435. For example, since schema 500 already include the hierarchical parent/child node structure Address/Street, child node CityInfo is created at a hierarchical level beneath the node Street and child node City is created at a hierarchical level beneath the node CityInfo, as shown in FIG. 5F.

It will now be assumed that flow continues as described above with respect to the remaining columns of workbook 200 until it is determined at S445 that no more columns remain to be processed and schema 300 of FIG. 3 has been extracted. Flow then continues to S450 to begin extracting objects for each row of workbook 200 which conform to the extracted schema.

Column values of a first row of workbook 200 are obtained at S450. Each column value is associated with a particular column of workbook 200. Next, at S455, an object is instantiated having the structure of schema 300 (i.e., an instance of the schema is created) and the nodes of the object are populated with corresponding ones of the values obtained at S450. In particular, each obtained value is used to populate the node of schema 300 which is associated with the column from which the vale was obtained. For example, the node Name of the object created for the first data row of workbook 200 is populated with the value Name1. Similarly, the node City of the object created for the first data row of workbook 200 is populated with the value City1.

Flow proceeds to S460 and then cycles through S450, S455 and S460 to create an object for each row of the workbook until no rows remain. The created objects may then be returned to a calling process at S460.

The created objects may be formatted and stored in any suitable manner which facilitates retrieval of complete objects or selected portions thereof. In one example, the object associated with the fourth data row of workbook 200 may be provided to a user as:
{FirstName: FirstName4, Name: Name4, Address: {Street: Street4, ZipCode: ZipCode4, CityInfo: {City: City4}}, Children: {Child1: Child1_4, Child2: Child2_4, Child3: Child3_4, Child4: Child4_4, Child5: Child4_5}, Job: {Title: JobTitle4, Address {Street: JobStreet4, City: {CityName: JobCityName4, ZipCode: JobZipCode4}}

Figure 6:
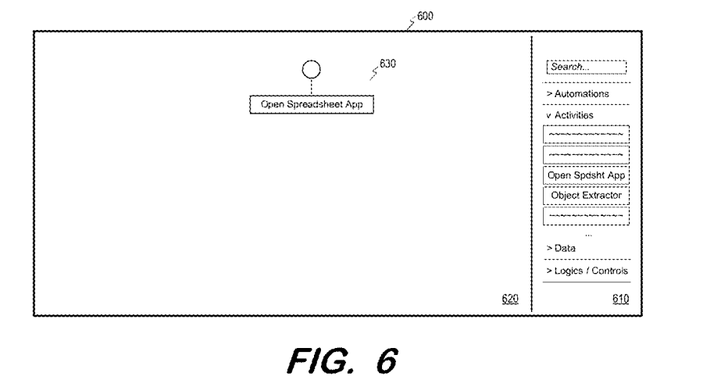
FIG. 6 is a view of a user interface to create an automation utilizing schema and object extraction according to some embodiments.

FIG. 6 is a view of automation editor user interface 600 according to some embodiments. User interface 600 may comprise a Web page provided by a cloud-based design time component for display by a Web browser executing on a local system. Alternatively, user interface 600 may be displayed by a dedicated client application for which the design time component is a corresponding server application. User interface 600 may also comprise a user interface of a standalone local application. Embodiments may employ any other suitable user interfaces providing any other functionality.

According to some embodiments, user interface 600 is intended to provide a low-code environment for designing executable processes, or automations. In one example, a user selects activities from tools pane 610 and drags the selected activities to appropriate positions of workspace 620 to create automation 630. A selected activity may require configuration (e.g., data and/or field selection, input parameters). For example, automation 630 begins with the activity Open Spreadsheet Application. The activity may be associated with a configuration interface (not shown) in which the user may specify the path of the spreadsheet application.

Figure 7:
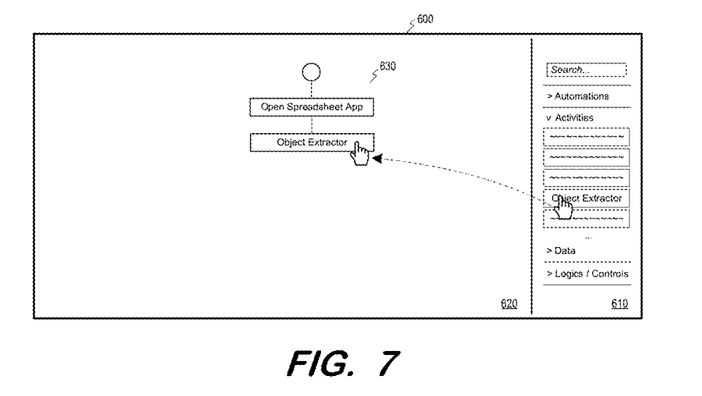
FIG. 7 is a view of a user interface illustrating incorporation of a schema and object extraction activity into an automation according to some embodiments.
Figure 8:
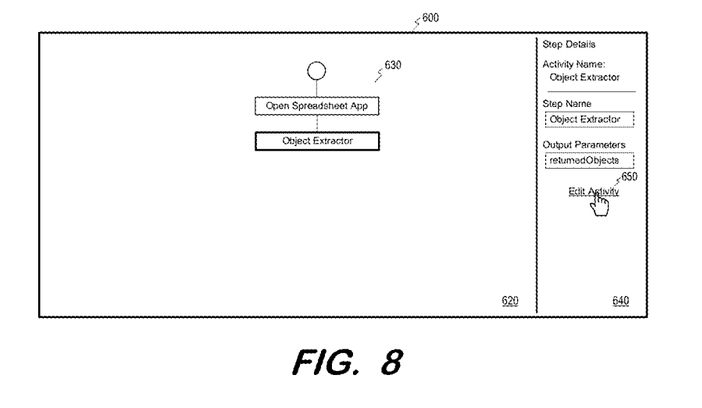
FIG. 8 is a view of a user interface illustrating configuration of a schema and object extraction activity according to some embodiments.

FIG. 7 illustrates selection of an Object Extractor activity and placement of the activity into automation 630. It will be assumed that the Object Extractor activity implements a process to extract a schema and objects from a workbook as described herein. FIG. 8 indicates (via bold lines in flow 630) that the activity has been selected and Details pane 640 is displayed in response. Details pane 640 allows editing of the name of the corresponding step of flow 630 and of a structure which includes the extracted objects. FIG. 8 also depicts selection of link 650 for editing parameters of the activity.

Figure 9:
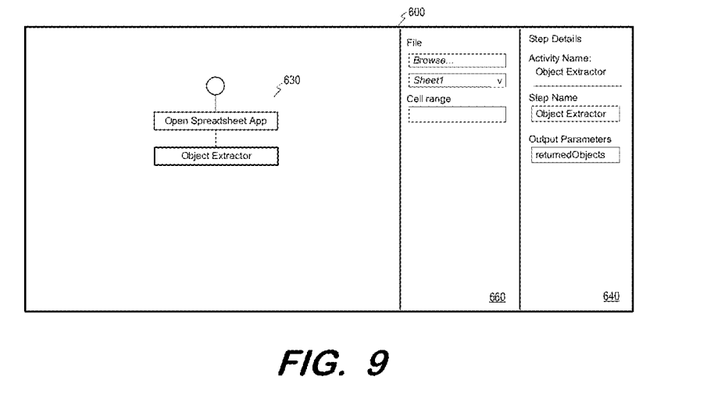
FIG. 9 is a view of a user interface illustrating configuration of a schema and object extraction activity according to some embodiments.

Selection of link 650 results in display of configuration pane 660 of FIG. 9. Configuration pane 660 allows a user to specify a spreadsheet file to open, a workbook of the spreadsheet, and a cell range of the workbook. Accordingly, the schema and object extraction described herein will be intended to operate on the cells of the specified cell range.

Configuration pane 660 of FIG. 9 is formatted according to the application associated with the data. For instance, if the data are contained in a .csv file, pane 660 might not specify "Cell range" but may rather include fields "From" and "To" to indicate the lines of the .csv file which should be read and analyzed as described herein. Pane 660 may also allow a user to specify the separator used for the csv file (e.g., comma or semicolon).

Figure 10:
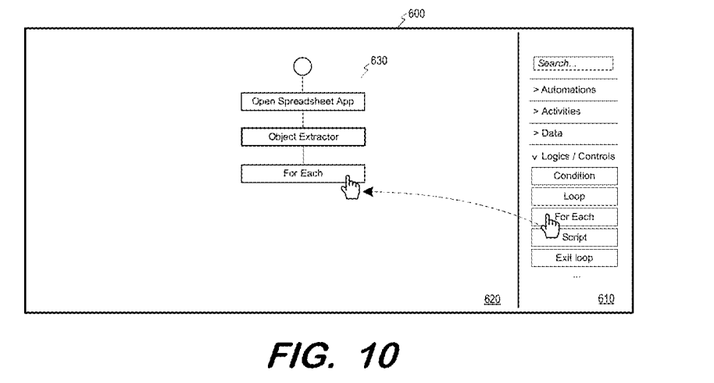
FIG. 10 is a view of a user interface illustrating incorporation of object processing activities into an automation according to some embodiments.
Figure 11:
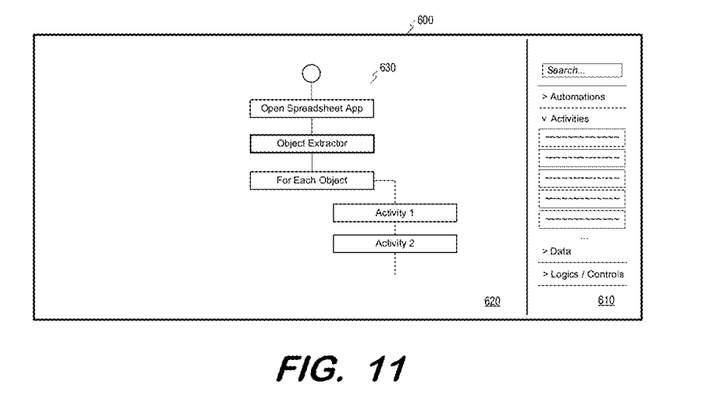
FIG. 11 is a view of a user interface illustrating incorporation of object processing activities into an automation according to some embodiments.

FIG. 10 illustrates selection of "for each" logic from tools pane 610 and placement of the logic into automation 630. The "for each" logic may be configured to define a loop. As discussed, it may be desirable to execute a series of steps over each row of a workbook. Accordingly, as shown in FIG. 11, the "for each" logic may be configured to define a loop over each extracted object. As further shown, the series of steps performed for each row may be defined using activities, logic, data and/or other automations provided by tools pane 610.

Advantageously, the objects extracted by the Object Extractor activity may be in a format which facilitates configuration of subsequent steps to manipulate the objects. In this regard, the node names of the objects are intuitive, and all child objects of a parent node may be referenced by referencing the parent node. Moreover, as described above, such configurations will not fail if additional columns are added, if exiting columns are moved, or if un-referenced columns are deleted from the workbook.

Figure 12:
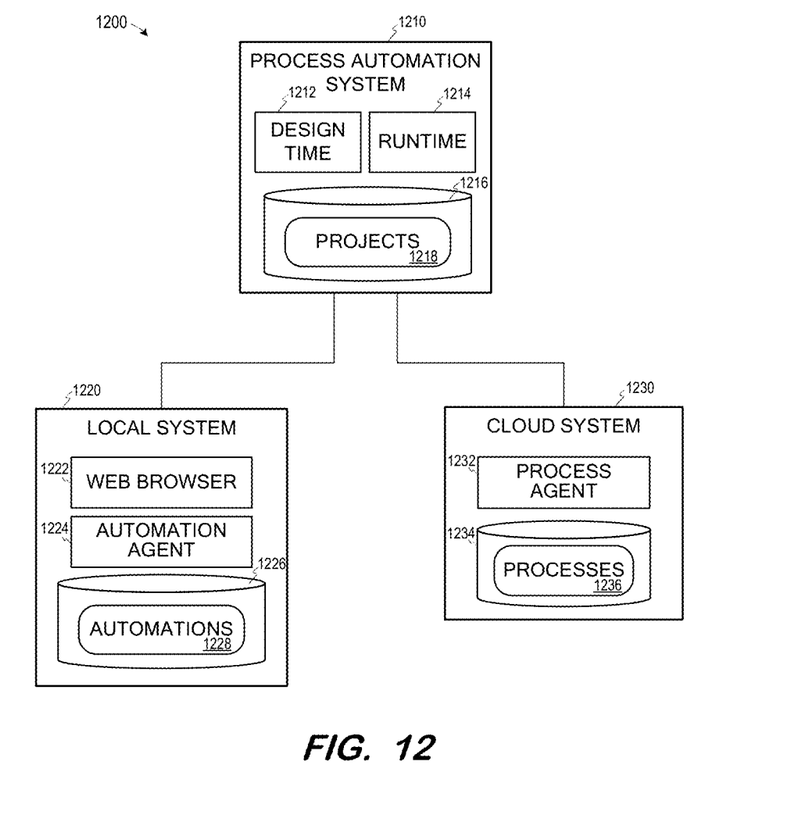
FIG. 12 is a block diagram of a process automation system architecture according to some embodiments.

Automation 620 may also include custom scripts. Development and maintenance of such a custom script may also benefit from the schema and object extraction of some embodiments. For example, prior systems require reference to a column index such as:

myMessage='Hello, my name is '+data[4,2]+''+data[4, 1];

In contrast, some embodiments allow use of the following:

myMessage='Hello, my name is '+myObject.FirstName+''+myObject.Name;

In another example, the schema can be passed directly to a function which is capable of using it (e.g., sendMessage (myObject.Address)). In contrast, prior systems may require the following:

var myAddress={ };
myAddress.Street=data[4, 3];
myAddress.ZipCode=data[4, 4];
myAddress.CityInfo={ };
myAddress.CityInfo.City=data[4, 5];
sendMessage(myAddress);

FIG. 12 is a diagram of a system in which some embodiments may be implemented. Local system 1220 includes processor-executable program code of Web browser 1222 and automation agent 1224. Web browser 1222 may be executed to communicate with design time component 1212 of process automation system 1210. A user of local system 1220 may manipulate user interfaces provided to Web browser 1222 by design time component 1212 to create and edit project artifacts such as automations and processes Runtime component 1214 of system 1210 may download automations 1228 of a given project 1218 to local system 1220 for storage in storage device 1226. Automations 1228 may comprise any data executable by automation agent 1224 to cause local system 1220 to perform intended activities. An automation or process may include steps to extract a schema and conforming objects from a workbook and perform processing on the objects as described herein.

Cloud system 1230 includes processor-executable program code of process agent 1232. Runtime component 1214 of system 1210 may provide processes 1236 to cloud system 1230 from projects 1218 for execution thereby. Processes 1236 may comprise any data executable by process agent 1232 to cause cloud system 1230 to perform intended actions. Such actions may comprise but are not limited to detection of an event. Upon detection of such an event, runtime component 1214 may trigger execution of a corresponding one or more automations 1228 by automation agent 1224.

Each of systems 1210, 1220 and 1230 may comprise any suitable combination of hardware and/or software. Any components described herein may be implemented using a distributed storage system and/or distributed nodes for performing computing operations as is known in the art.

Figure 13:
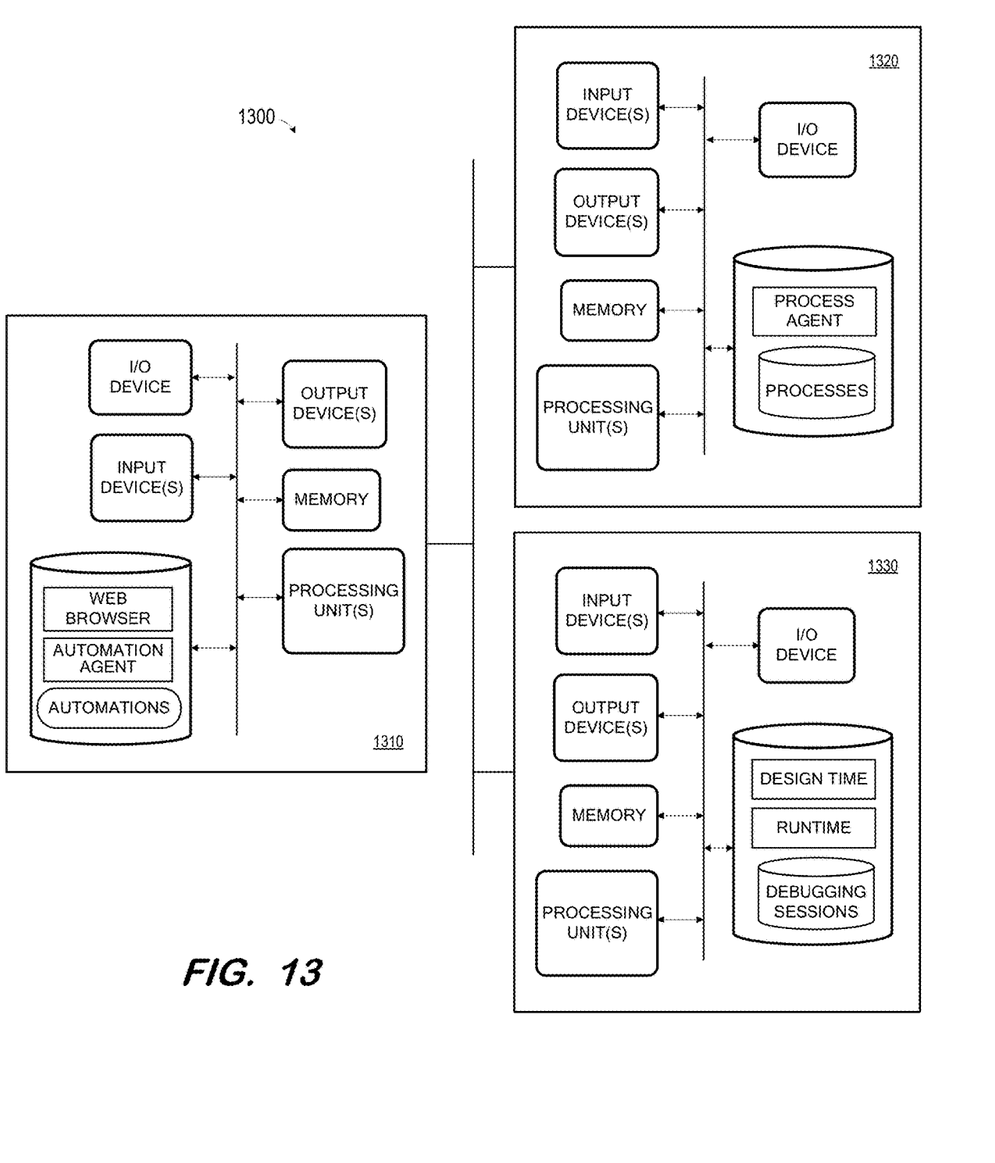
FIG. 13 is a block diagram of computing systems implementing a process automation system architecture according to some embodiments.

FIG. 13 is a block diagram of computing systems implementing a process automation system architecture according to some embodiments. System 1300 includes process automation system 1310 which may provide orchestration for distributing software jobs such as automations to local system 1320 for execution based on triggering initiated by cloud system 1330.

Process automation system 1310 includes a design time component for providing user interfaces to client applications to create automations. Local system 1320 includes processor-executable program code of a Web browser and an automation agent. The Web browser may be executed to communicate with the design time component of process automation system 1310 to create and edit automations including steps to extract a schema and associated objects from a spreadsheet workbook. Such automations may be converted to executable code by the design time component and deployed to and executed by local system 1320 by the runtime component of system 1310.

Cloud system 1330 includes processor-executable program code of a process agent to execute stored processes and to trigger the execution of automations on system 1320. Each of systems 1310, 1320 and 1330 may comprise a general-purpose standalone or distributed computing system and may execute program code using processing unit(s) to perform any of the functions described herein.

All data storage mentioned herein may be provided via combinations of computer-readable media such as magnetic storage devices (e.g., hard disk drives and flash memory), optical storage devices, Read Only Memory (ROM) devices, etc., while volatile memory may comprise Random Access Memory (RAM), Storage Class Memory (SCM) or any other fast-access memory. All systems and processes discussed herein may be embodied in program code stored on one or more non-transitory computer-readable media.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A system comprising:
   a memory storing processor-executable program code;
   a processing unit to execute the processor-executable program code to cause the system to:
   identify a respective column name of each of a plurality of columns of a table comprising a plurality of rows including a header row comprising a plurality of column names;

automatically determine a hierarchical schema of the table by:
for each column name of the header row:
 determine whether the column name of the header row includes a delimiter; and
 in response to determination that the column name of the header row includes a delimiter, define a node of the hierarchical schema associated with a portion of the column name following the delimiter, the node being a child node of a parent node associated with a portion of the column name preceding the delimiter;
 in response to determination that the column name of the header row does not include a delimiter, create a node associated with the column name at a highest hierarchical level of the schema;
for each row of the table:
 determine a value associated with each of the plurality of columns;
 create an instance of the hierarchical schema; and
 populate the instance with the determined values; and
output the instances.

2. A system according to claim 1, wherein automatic determination of the hierarchical schema of the table comprises:
 determination that a second column name includes a delimiter separating a child clause and a parent clause; and
 in response to the determination that the second column name includes a delimiter separating a child clause and a parent clause, create one or more nodes associated with the parent clause and create a node associated with the child clause at a hierarchical level of the schema below the one or more nodes associated with the parent clause.

3. A system according to claim 2, wherein the determination that the second column name includes a delimiter comprises a determination that the second column name includes two delimiters, and wherein
 creation of the one or more nodes associated with the parent clause comprises creation of a first node associated with the parent clause at the highest hierarchical level of the schema and a second node at a hierarchical level under the first node.

4. A computer-implemented method, comprising:
reading a spreadsheet workbook comprising a plurality of rows and a header row comprising a plurality of column names;
automatically determining a hierarchical schema by:
for each column name of the header row:
determining whether the column name of the header row includes a delimiter; and
in response to determining that the column name of the header row includes a delimiter, defining a node of the hierarchical schema associated with a portion of the column name following the delimiter, the node being a child node of a parent node associated with a portion of the column name preceding the delimiter;
in response to determining that the column name of the header row does not include a delimiter separating a parent clause and a child clause, creating a node associated with the column name at a highest hierarchical level of the schema;
for each row of the plurality of rows:
 determining a value associated with each of the plurality of column names;
 creating an instance of the hierarchical schema; and
 for each determined value, populating a node of the instance of the hierarchical schema associated with an associated column name; and
outputting the instances.

5. A method according to claim 4, wherein automatically determining the hierarchical schema comprises:
 determining that a second column name includes a delimiter separating a child clause and a parent clause; and
 in response to determining that the second column name includes a delimiter separating a parent clause and a child clause, create one or more nodes associated with the parent clause and create a node associated with the second column name at a hierarchical level of the schema below the one or more nodes associated with the parent clause.

6. A method according to claim 5, wherein determining that the second column name includes a delimiter separating a parent clause and a child clause comprises determining that the second column name includes two delimiters, and
 wherein creating one or more nodes associated with the parent clause comprises creating a first node associated with the parent clause at the highest hierarchical level of the schema and a second node at a hierarchical level under the first node.

7. A non-transitory computer-readable medium storing program code that when executed by a computing system causes the computing system to:
read a spreadsheet workbook comprising a plurality of rows and a header row comprising a plurality of column names;
automatically determine a hierarchical schema by:
for each column name of the header row:
determine whether the column name of the header row includes a delimiter; and
in response to determination that the column name of the header row includes a delimiter, define a node of the hierarchical schema associated with a portion of the column name following the delimiter, the node being a child node of a parent node associated with a portion of the column name preceding the delimiter;
in response to determining that the column name of the header row does not include a delimiter, create a node associated with the column name at a highest hierarchical level of the schema;
for each row of the plurality of rows:
 determine a value associated with each of the plurality of column names;
 create an instance of the hierarchical schema; and
 for each determined value, populate a node of the instance of the hierarchical schema associated with an associated column name; and
output the instances.

8. A medium according to claim 7, wherein automatic determination of the hierarchical schema comprises:
 determination that a second column name includes a delimiter separating a child clause and a parent clause; and
 in response to the determination that the second column name includes a delimiter separating a parent clause and a child clause, creation of one or more nodes associated with the parent clause and creation of a node associated with the second column name at a hierarchical level of the schema below the one or more nodes associated with the parent clause.

9. A medium according to claim 8, wherein the determination that the second column name includes a delimiter separating a parent clause and a child clause comprises a determination that the second column name includes two delimiters, and wherein creation of one or more nodes associated with the parent clause comprises creation of a first node associated with the parent clause at the highest hierarchical level of the schema and a second node at a hierarchical level under the first node.

\* \* \* \* \*